Feb. 8, 1938.  N. T. MARCELLI  2,107,489
FISHING HOOK
Filed May 6, 1936  2 Sheets-Sheet 2
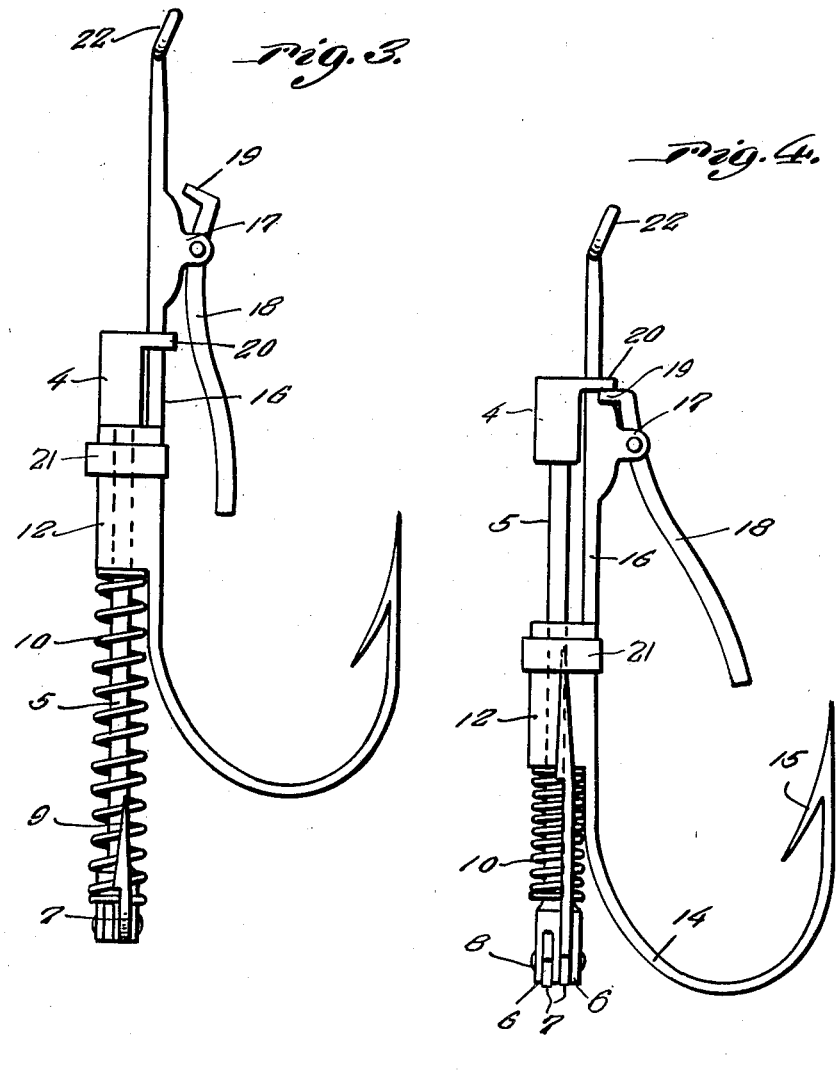
Inventor
N. T. Marcelli
By Clarence A. O'Brien, and
Hyman Berman
Attorneys Patented Feb. 8, 1938

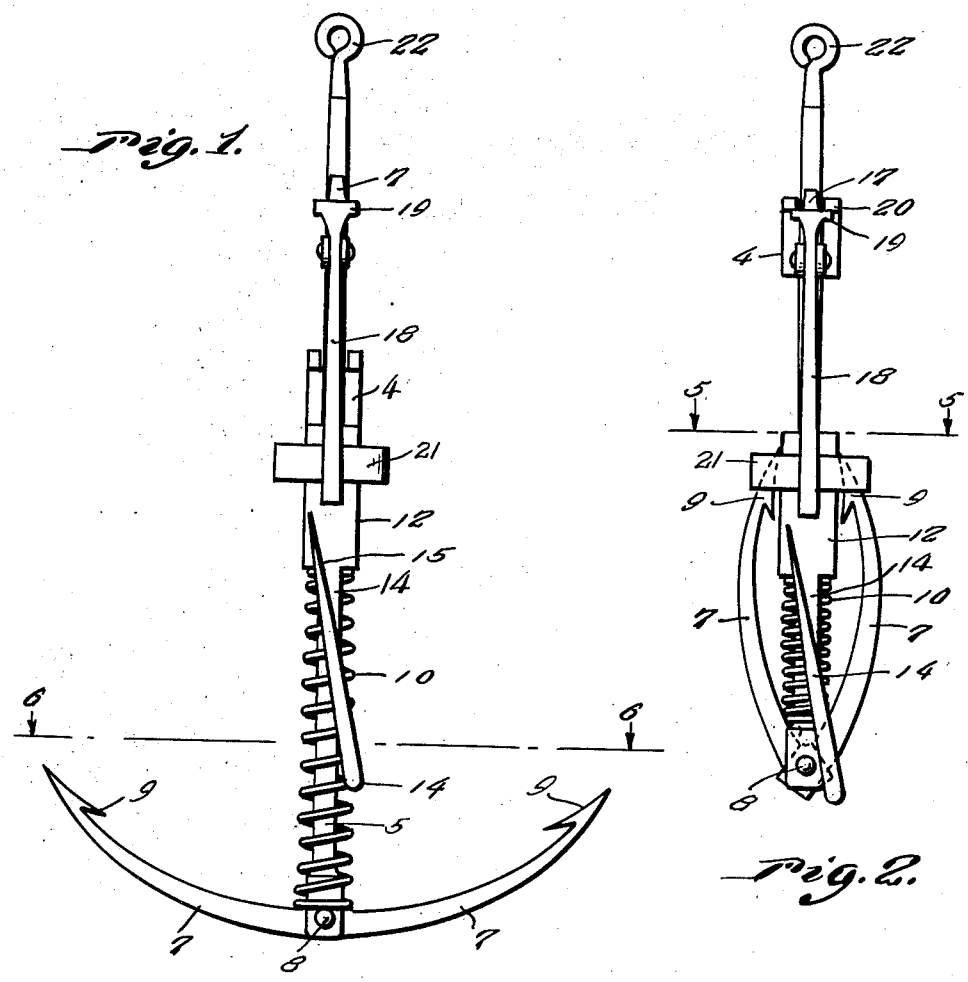

2,107,489

UNITED STATES PATENT OFFICE 2,107,489

FISHING HOOK

Nicholas T. Marcelli, Collinsville, Calif.

Application May 6, 1936, Serial No. 78,210

1 Claim. (Cl. 43—36)

The present invention relates to a fishing hook and has for its prime object to provide means whereby a hook of this nature may be easily and readily baited and may be utilized to advantage in the catching of game fish.

A still further important object of the invention resides in the provision of a fishing hook of this nature which is simple in its construction, inexpensive to manufacture, durable, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of the invention showing the same in open position.

Figure 2 is a similar view showing the device in set position.

Figure 3 is a side elevation taken at right angles to that shown in Figures 1 and 2.

Figure 4 is a view similar to Figure 3 showing the device in a set position.

Figure 5 is a detail sectional view taken substantially on the line 5—5 of Figure 2.

Figure 6 is a detail sectional view taken substantially on the line 6—6 of Figure 1.

Referring to the drawings in detail it will be seen that numeral 5 denotes a rod the bottom end of which is provided with a pair of bifurcations 6 with curved gaff hooks 7 pivotally mounted therein as at 8. The gaff hooks 7 terminate in barbs 9. A coil spring 10 is disposed about the rod 5 with lower end disposed against the pivoted ends of hooks 7 to normally hold the hooks 7 in the position shown in Figure 1. A sleeve 12 is slidable on the rod being impinged upwardly by the spring 10 and has incorporated therein a hook 14 terminating in a barb 15. The hook 14 has an upwardly disposed extension 16 provided with a pair of ears 17 between which is pivoted a finger or trigger 18 the lower end of which terminates adjacent the barb 15. The upper end terminates in an angular extension 19 to engage under a projecting open slotted guide 20 formed on enlargement 4 of rod 5. The extension 16 has a slide bearing in the open slot of the guide 20 and extends upwardly beyond the said guide and terminates in a line attaching eye 22. The extension 19 is adapted to engage under the guide 20 as shown at Figure 4 for holding the parts in a cocked position. When the device is cocked, the spring 10 is compressed between the pivoted ends of the gaff hooks 7 at one end of the spring and the sleeve 12 at the other end of the spring; the gaff hooks 7 being swung upwardly toward the rod 5 with their upper free ends encircled by a retaining ring 21 on sleeve 12. In taking the bait from the element 15, naturally the fish will engage the finger or element 18 causing the releasing of enlargement 4 and bringing the spring 10 into play so that the parts will assume the position shown in Figure 6. The hook 7 will then enter the body of the fish to firmly hold it against accidental removal from the hook 15. As shown in Figure 5, the ring 21 is oval-shaped and has its side portions seated in recesses 21' in the sleeve and is thus held against longitudinal movement.

It is thought that the construction, operation, utility and advantages of this invention will now be quite apparent to those skilled in this art without a more detailed description thereof.

It will be apparent that changes in the details of construction, and in the combination and arrangement of parts may be resorted to without departing from the spirit or scope of the invention as hereinafter claimed or sacrificing any of its advantages.

What is claimed is:—

A device of the class described comprising a bait hook, a sleeve fixedly carried by the shank of said hook, a ring member encircling the sleeve and secured thereto against movement, said ring member having portions spaced from the sleeve, a rod slidably mounted in said sleeve, a plurality of hooks pivotally carried at the lower end of said rod and arranged with their free ends engaged in the ring when said rod is in a retracted position, a spring carried by the rod and contacting the pivoted hooks to project the same downwardly and outwardly and trip means releasably connecting the rod to the shank of the bait hook.

NICHOLAS T. MARCELLI.